(12) United States Patent
Burns et al.

(10) Patent No.: US 6,184,408 B1
(45) Date of Patent: Feb. 6, 2001

(54) METHOD FOR PREPARATION OF HYDROPHOBIC PRECIPITATED SILICA

(75) Inventors: Gary Thomas Burns, Ohain (BE); Qin Deng; James Richard Hahn, both of Midland, MI (US); Thomas G. Krivak, Harrison City; Timothy A. Okel, Trafford, both of PA (US); Clifford Carlton Reese, Midland, MI (US)

(73) Assignee: Dow Corning Corporation, Midland, MI (US)

( * ) Notice: Under 35 U.S.C. 154(b), the term of this patent shall be extended for 0 days.

(21) Appl. No.: 09/299,863

(22) Filed: Apr. 28, 1999

(51) Int. Cl.$^7$ ....................................................... C07F 7/08
(52) U.S. Cl. .................. 556/450; 556/400; 524/403; 524/434; 524/435; 524/780; 524/785; 528/12; 528/30; 528/31; 528/32
(58) Field of Search ..................... 556/450, 400; 524/403, 454, 435, 780, 785; 528/12, 30, 31, 32

(56) References Cited

U.S. PATENT DOCUMENTS

| | | | |
|---|---|---|---|
| 3,015,645 | 1/1962 | Tyler | 260/46.5 |
| 4,072,796 | 2/1978 | Reinhardt et al. | 428/405 |
| 5,009,874 | 4/1991 | Parmentier et al. | 423/335 |
| 5,576,453 | * 11/1996 | Buese | 556/400 |
| 5,708,069 | 1/1998 | Burns et al. | 524/403 |
| 5,750,610 | 5/1998 | Burns et al. | 524/434 |

OTHER PUBLICATIONS

Iler, The Chemistry of Silica, John Wiley & Sons, NY, NY pp. 554–564, Jun. 1979.

Journal of the American Chemical Society, vol. 60, p. 309, Feb. 1938.

Polmanteer et al., Rubber chem. & Technology, 48:796, Mar. 1975.

* cited by examiner

*Primary Examiner*—Paul F. Shaver
(74) *Attorney, Agent, or Firm*—William F. Boley

(57) ABSTRACT

A method for the preparation of hydrophobic precipitated silica. The method comprises contacting an aqueous suspension of a hydrophilic precipitated silica with (1) a catalytic amount of an acid and (2) an organosilicon compound in the presence of (3) a water-miscible organic solvent in an amount sufficient to facilitate reaction of the hydrophilic precipitated silica with the organosilicon compound to form a hydrophobic precipitated silica.

18 Claims, No Drawings

METHOD FOR PREPARATION OF HYDROPHOBIC PRECIPITATED SILICA

BACKGROUND OF INVENTION

It is well known that silicone rubbers formed from the vulcanization of polydiorganosiloxane fluids or gums alone generally have low elongation and tensile strength properties. One means for improving the physical properties of such silicone rubbers involves the incorporation of a reinforcing silica filler such as fumed silica, colloidal silica, silica gel, or precipitated silica into the fluid or gum prior to curing. However, such silicas have a tendency to interact with the polydiorganosiloxane fluid or gum causing a phenomenon typically referred to as "crepe hardening." A great deal of effort has been made in the past to treat the surface of reinforcing silica fillers with silicon compounds to make the surface of the silica hydrophobic. This surface treatment reduces or diminishes the tendency of the compositions to crepe harden and improves the physical properties of the cured silicone rubber. The present invention is a cost effective method for preparing hydrophobic precipitated silicas, which are particularly useful as reinforcing fillers in curable silicone compositions. In addition to being cost effective, the present method produces hydrophobic precipitated silicas which retain more of their structure, such as void volume, than hydrophobic precipitated silicas prepared by other methods known in the art.

Lentz, U.S. Pat. No. 3,015,645, teaches the making of hydrophobic silica powders by reacting an organosilicon compound such as dimethyldichlorosilane or trimethylmethoxysilane with a silica hydrogel in the presence of an acidic catalyst to form a hydrophobic silica hydrogel. The hydrophobic silica hydrogel in the aqueous phase is contacted with a water-immiscible organic solvent to convert the hydrophobic silica hydrogel to a hydrophobic silica organogel which segregates into the organic phase.

Burns et al., U.S. Pat. No. 5,708,069, teach a method for the preparation of hydrophobic silica gels under neutral conditions. The method comprises two steps, where in the first step the pH of a silica hydrosol is adjusted with a base to within a range of about pH 3 to pH 7 to facilitate formation of a silica hydrogel. In the second step the silica hydrogel is contacted with an organosilicon compound in the presence of a catalytic amount of a strong acid to effect hydrophobing of the silica hydrogel. Burns et al. teach that during conduct of the second step it may be desirable to add a surfactant or water- miscible organic solvent to facilitate the reaction of the organosilicon compound with the hydrophilic silica hydrogel.

Burns et al., U.S. Pat. No. 5,750,610, teach a method for preparing organosilicate-modified silica gels. The method comprises two steps, where in the first step an organosilicate-modified silica hydrosol is heat treated in the presence of a strong mineral acid at a pH less than about pH 1 to form an organosilicate-modified silica hydrogel. In the second step the organosilicate-modified silica hydrogel is contacted with an organosilicon compound in the presence of a catalytic amount of a strong acid to effect hydrophobing of the organosilicate-modified silica hydrogel thereby forming a hydrophobic organosilicate-modified hydrogel. Burns et al. teach that during conduct of the second step it may be desirable to add a surfactant or water-miscible organic solvent to facilitate the reaction of the organosilicon compound with the organosilicate-modified silica hydrogel.

Reinhardt et al., U.S. Pat. No. 4,072,796, describe a method where finely divided hydrophobic silica and silicates are prepared by precipitating of alkali silicate solutions with mineral acids or metal salt solutions and treating with organohalosilanes. The organohalosilanes are a prepolycondensed organohalosilane or a mixture of prepolycondensed organohalosilanes.

Parmentier et al., U.S. Pat. No. 5,009,874 describe a method for making a hydrophobic precipitated silica useful as a reinforcing filler in silicone elastomers. In a first step the precipitated silica in aqueous suspension is hydrophobed with an organosilicon compound. In a second step an organic solvent is added to effect granulation of the silica. The method is claimed to form hydrophobic, essentially spherical precipitated silica granules having a median particle size of at least 0.08 mm, a density of at least 0.15, a water wettability of at least 20%, and maximum water uptake of 5%.

Hydrophobic precipitated silicas prepared by the present method are useful in many applications such as reinforcing and extending filler in natural rubbers, thermal insulation, and as filler in flotation devices, they are particularly useful as reinforcing fillers in silicone rubber compositions.

SUMMARY OF INVENTION

The present method comprises contacting an aqueous suspension of a hydrophilic precipitated silica with (1) a catalytic amount of an acid and (2) an organosilicon compound selected from the group consisting of organosilanes described by formula $$R^1{}_a H_b SiX_{4-a-b}, \qquad (1)$$

organosiloxanes described by formula $$R^2{}_n SiO_{(4-n)/2}, \qquad (2)$$

and organodisilazanes described by formula $$(R^3{}_3Si)_2NH, \qquad (3)$$

in the presence of (3) a water-miscible organic solvent in an amount sufficient to facilitate reaction of the hydrophilic precipitated silica with the organosilicon compound to form a hydrophobic precipitated silica; where each $R^1$ is an independently selected hydrocarbon radical comprising 1 to about 12 carbon atoms, each $R^2$ is independently selected from the group consisting of hydrogen, chlorine, hydroxy, and hydrocarbon radicals comprising 1 to about 12 carbon atoms with the proviso that at least 50 mole percent of the $R^2$ substituents are hydrocarbon radicals, each $R^3$ is an independently selected hydrocarbon radical comprising 1 to about 12 carbon atoms, each X is an independently selected hydrolyzable group bonded to silicon, a=1, 2, or 3; b=0 or 1; a+b=1, 2, or 3 with the proviso that when b=1 then a+b=2 or 3; and n is an integer from 2 to 3 inclusive.

DESCRIPTION OF INVENTION

The present invention is a method for the preparation of hydrophobic precipitated silica. The method comprises contacting an aqueous suspension of a hydrophilic precipitated silica with (1) a catalytic amount of an acid and (2) an organosilicon compound selected from the group consisting of organosilanes described by formula $$R^1{}_a H_b SiX_{4-a-b}, \qquad (1)$$

organosiloxanes described by formula $$R^2{}_n SiO_{(4-n)/2}, \qquad (2)$$

and organodisilazanes described by formula $$(R^3{}_3Si)_2NH, \qquad (3)$$

in the presence of (3) a water-miscible organic solvent in an amount sufficient to facilitate reaction of the hydrophilic precipitated silica with the organosilicon compound to form a hydrophobic precipitated silica; where each $R^1$ is an independently selected hydrocarbon radical comprising 1 to about 12 carbon atoms, each $R^2$ is independently selected from the group consisting of hydrogen, chlorine, hydroxy, and hydrocarbon radicals comprising 1 to about 12 carbon atoms with the proviso that at least 50 mole percent of the $R^2$ substituents are hydrocarbon radicals, each $R^3$ is an independently selected hydrocarbon radical comprising 1 to about 12 carbon atoms, each X is an independently selected hydrolyzable group bonded to silicon, a=1, 2, or 3; b=0 or 1; a+b=1, 2, or 3 with the proviso that when b=1 then a+b=2 or 3; and n is an integer from 2 to 3 inclusive.

In the present method the hydrophilic precipitated silica is made hydrophobic by reacting hydroxyl groups on the silica with an organosilicon compound. By "precipitated silica " it is meant amorphous aggregates of primary particles of colloidal silica prepared by coagulation of a silica hydrosol, which aggregates have not at any point existed as macroscopic gel during their preparation. Methods for preparing such hydrophilic precipitated silicas are well known in the art and are described in, for example, Iler, The Chemistry of Silica, John Wiley & Sons, NY, N.Y., pp 554–564, 1979.

The precipitated silicas treated by the present method are distinguishable from amorphous silica gels by their different properties as referenced in Iler, supra. While amorphous silica gel is usually produced commercially at low pH by acidifying an aqueous solution of a soluble metal silicate, typically sodium silicate, with acid it can also be produced by adding sodium silicate to the acid. It should be noted that the terms alcogel and aquagel are sometimes used to indicate silica gels in which the pores are filled with the corresponding alcohol or water. The acid used is generally a strong mineral acid such as sulfuric acid or hydrochloric acid, although carbon dioxide is sometimes use. Since there is essentially no difference in density between the gel phase and the surrounding liquid phase while the viscosity is low, the gel phase does not settle out, i.e. it does not precipitate. Amorphous silica gel, then, may be described as a non-precipitated, coherent, rigid, three-dimensional network of contiguous particles of colloidal amorphous silica which can fill the whole volume of the sol. This gelatinous mass is sometimes referred to as a silica hydrogel. Following gel formation and washing the liquid is removed by drying to yield a silica xerogel. The state of subdivision of amorphous silica gel ranges from large solid masses to submicroscopic particles and the degree of hydration from almost anhydrous silica to a soft gelatinous mass containing on the order of 100 parts water per part of silica by weight. Amorphous aerogel is a class of amorphous silica gel which is produced by (a) forming amorphous silica gel by acidification in the conventional manner, (b) replacing most of the water in the gel with a liquid such as either an alcohol or another organic solvent which wets the surface of the silica gel pores, has a very low surface tension, and evaporates at ordinary temperatures, and (c) removing the liquid under pressure above the critical temperature of the alcohol or solvent so that there is no meniscus between the liquid and gas phases.

In comparison, amorphous precipitated silica is produced commercially by combining an aqueous solution of a soluble metal silicate, typically an alkali metal silicate such as sodium silicate, and an acid to that colloidal particles will grow in weakly alkaline solution and be coagulated by the alkali metal ions of the resulting soluble alkali metal salt. Various acids may be used including mineral acids and/or carbon dioxide. In the absence of a coagulant, the colloidal silica particles are not precipitated from solution at any pH. The coagulant used to effect precipitation may be the soluble alkali metal salt produced during formation of the colloidal silica particles, added electrolyte such as a soluble inorganic or organic salt, or a combination of both.

Therefore, the term "precipitated silica" as used herein refers to amorphous precipitated aggregates of primary particles of colloidal silica prepared by coagulation of a silica hydrosol, which aggregates have not at any point existed as macroscopic gel during their preparation. The size of the aggregates and the degree of hydration may vary widely.

Precipitated silica powders differ from amorphous silica gels that have been pulverized in ordinarily having a more open structure, i.e. a higher specific pore volume. In addition, the specific surface area of amorphous precipitated silica as measure by the Brunauer, Emmett, Teller (BET) method using nitrogen as the adsorbate is typically lower than that of amorphous silica gel.

The BET surface area of the hydrophilic precipitated silica used in the present method can generally be within a range of about 50 $m^2/g$ to 1000 $m^2/g$. Preferred is when the hydrophilic precipitated silica has a surface area within a range of about 1 00 $m^2/g$ to 500 $m^2/g$.

The hydrophilic precipitated silica is added to the present method as an aqueous suspension. The concentration of hydrophilic precipitated silica in the aqueous suspension is not critical and can be within a range of about 4 to 90 weight percent. Preferred is when the concentration of hydrophilic precipitated silica in the aqueous suspension is within a range of about 4 to 50 weight percent. Most preferred is when the concentration of hydrophilic precipitated silica in the aqueous suspension is within a range of about 4 to 20 weight percent.

In the present method the aqueous suspension of hydrophilic precipitated silica is contacted with one or more of the organosilicon compounds described by formulas (1), (2), and (3) in the presence of a catalytic amount of an acid. The acid catalyst can be, for example, a mineral acid such as hydrochloric, hydroiodic, sulfuric, nitric, benzene sulfonic, and phosphoric acid. When the organosilicon compound is, for example, a chlorosilane, the catalytic amount of the acid may be generated in situ by hydrolysis of the chlorosilane or the reaction of the chlorosilane directly with hydroxyl substituents of the hydrophilic precipitated silica. It is only necessary that the acid be present in an amount sufficient to effect reaction of the organosilicon compound with the hydrophilic precipitated silica. It is preferred that the acid catalyst provide a pH less than about pH 6. More preferred is when the acid catalyst provides a pH less than about pH 3.

The temperature at which the contacting of the present method is conducted is not critical and can be within a range of about 15° C. to 250° C. Generally, it is preferred that the contacting be conducted at a temperature within a range of about 20° C. to 150° C. The temperature at which the contacting is conducted can be the reflux temperature of the water-miscible organic solvent.

The present method requires the presence of a water-miscible organic solvent in an amount sufficient to facilitate the hydrophobing of the hydrophilic precipitated silica with the organosilicon compound. Preferred is when the water-miscible organic solvent comprises at least 5 weight percent of the aqueous suspension comprising the hydrophilic precipitated silica. Even more preferred is when the water miscible organic solvent comprises about 15 to 50 weight percent of the aqueous suspension. Most preferred is when the water-miscible organic solvent comprises about 20 to 30 weight percent of the aqueous suspension. Suitable water-miscible solvents include, for example, alcohols such as ethanol, isopropanol, and tetrahydrofuran. Isopropanol is a preferred water- miscible organic solvent for use in the present method.

In the present method the hydrophilic precipitated silica is reacted with one or more organosilicon compounds described by formulas (1), (2), and (3). In formula (1) each $R^1$ can be an independently selected hydrocarbon radical comprising 1 to about 12 carbon atoms. $R^1$ can be a saturated or unsaturated monovalent hydrocarbon radical. $R^1$ can be a substituted or non-substituted monovalent hydrocarbon radical. $R^1$ can be, for example, alkyl radicals such as methyl, ethyl, propyl, t-butyl, hexyl, heptyl, octyl, decyl, and dodecyl; alkenyl radicals such as vinyl, allyl, and hexenyl; substituted alkyl radicals such as chloromethyl, 3,3,3-trifluoropropyl, and 6-chlorohexyl; and aryl radicals such as phenyl, naphthyl, and tolyl. $R^1$ can be an organofunctional hydrocarbon radical comprising 1 to about 12 carbon atoms where, for example the functionality is mercapto, disulfide, polysulfide, amino, carboxylic acid carbinol ester, or amido. A preferred organofunctional hydrocarbon radical is one having mercapto, disulfide, or polysulfide functionality.

In formula (1) each X is an independently selected hydrolyzable group bonded to silicon. Preferred is when each X is independently selected from the group consisting of halogen, alkoxy radicals comprising 1 to about 12 carbon atoms, acyloxy radicals comprising about 1 to 12 carbon atoms, and oximo radicals. When X is a halogen, it is preferred that the halogen be chlorine. When X is an alkoxy radical, X may be, for example, methoxy, ethoxy, and propoxy. When X is an acyloxy radical, X may be, for example, acetoxy. More preferred is where each X is selected from the group consisting of chlorine atoms and methoxy.

In formula (2) each $R^2$ is independently selected from the group consisting of hydrogen, chlorine, hydroxyl, and hydrocarbon radicals comprising 1 to about 12 carbon atoms, with the proviso that at least 50 mole percent of the $R^2$ substituents are hydrocarbon radicals. $R^2$ can be the same as $R^1$ as described above. The organosiloxanes described by formula (2) can be, for example, linear or cyclic in structure. The viscosity of the organosiloxanes described by formula (2) is not limiting and can range from that of a fluid to a gum. Generally, higher molecular weight organosiloxanes will be cleaved by the acidic conditions of the present method allowing them to react with the hydrophilic precipitated silica.

In formula (3) each $R^3$ is an independently selected hydrocarbon radical comprising 1 to about 12 carbon atoms. $R^3$ can be the same as those hydrocarbon radicals described for $R^1$. Preferred is when $R^3$ is methyl.

Examples of useful organosilicon compounds include diethyldichlorosilane, allylmethyldichlorosilane, methylphenyldichlorosilane, phenylethyldiethoxysilane, 3,3,3-trifluoropropylmethyldichlorosilane, trimethylbutoxysilane, symdiphenyltetramethyldisiloxane, trivinyltrimethylcyclotrisiloxane, octamethylcyclotetrasiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichlorosilane, hexamethyldisilazane, mercaptopropylmethyldimethoxysilane, bis{3-(triethoxysilyl)propyl}tetrasulfide, polydimethylcyclosiloxanes comprising 3 to about 20 dimethylsiloxy units and preferably 3 to about 7 dimethylsiloxy units; and trimethylsiloxy, dimethylchlorosiloxy, or hydroxydimethylsiloxy endblocked polydimethylsiloxane polymers having a viscosity within a range of about 1 mPa.s to 1,000 mPa.s at 25° C.

The amount of organosilicon compound added to the method is that sufficient to adequately hydrophobed the hydrophilic precipitated silica to provide a hydrophobic precipitated silica suitable for its intended use. Generally, the organosilicon compound should be added to the method in an amount such that there is at least about 0.1 organosilyl unit per square nanometer of BET surface area of the hydrophilic precipitated silica. It is preferred that the organosilicon compound be added in an amount providing excess organosilyl units in relation to the hydroxyl groups available on the hydrophilic precipitated silica for reaction. The upper limit of the amount of organosilicon compound added to the process is not critical since any amount in excess of the amount required to react with essentially all of the hydroxy substituents of the hydrophilic precipitated silica will act as a solvent for the method. Excess organosilicon compound can be removed by distillation, washing with a solvent, or other known seperation techniques.

In the present method after formation of the hydrophobic precipitated silica it may be desirable to add a water-immiscible organic solvent to the resulting aqueous suspension to effect separation of the hydrophobic precipitated silica from the aqueous suspension. It is preferred that the water-immiscible organic solvent be added at a solvent to silica weight ratio greater than about 0.1:1 to effect separation of the hydrophobic precipitated silica from the aqueous suspension.

For purpose of this invention any organic solvent immiscible with water can be used. Suitable water-immiscible organic solvents include low molecular weight siloxanes such as hexamethyldisiloxane, octamethylcyclotetrasiloxane, diphenyltetramethyldisiloxane and trimethylsiloxy endblocked polydimethylsiloxane fluids. When a siloxane is employed as a solvent it may serve both as a solvent and as a reactant with the hydrophilic precipitated silica. In addition, suitable water-immiscible organic solvents include aromatic hydrocarbons such as toluene and xylene; heptane, hexane, and other aliphatic hydrocarbon solvents; cycloalkanes such as cyclohexane; ethers such as diethylether and dibutylether; halohydrocarbon solvents such as methylene chloride, chloroform, ethylene chloride, and chlorobenzene; and ketones such as methylisobutylketone.

The amount of water-immiscible organic solvent added to the present method should provide a solvent to silica weight ratio greater than about 0.05:1. Preferred is a solvent to silica weight ratio within a range of about 0.1:1 to 10:1. Most preferred is a solvent to silica weight ratio within a range of about 1:1 to 5:1. The upper limit for the amount of water-immiscible solvent added to the method is limited only by economic considerations such as solvent cost, solvent recovery or disposal expense, and equipment capacity.

It is preferred that the water-immiscible organic solvent have a boiling point below about 250° C. to facilitate its removal from the hydrophobic precipitated silica. However, the boiling point of the water-immiscible organic solvent is not critical since the solvent may be removed from the hydrophobic silica by filtration, centrifuging, or other suitable means.

The hydrophobic precipitated silica formed by the present method may be used as an aqueous suspension or slurry, may be recovered by such techniques as filtration or centrifugation with or without the addition of water immiscible organic solvent to facilitate recovery, may be further washed to reduce contaminates, and may be dried prior to use.

The following examples are provided to illustrate the present invention. These examples are not intended to limit the scope of the claims provided herein.

EXAMPLE 1

A precipitated silica was formed by neutralizing a sodium silicate solution. The precipitated silica was filtered and washed until a low electrolyte level was obtained. An aliquot of the precipitated silica was dried and the BET surface area determined to be 320 $m^2/g$. To a 5 L flask having a bottom drain and equipped with a thermometer, mechanical stirrer, and a Dean-Stark trap equipped with a reflux condenser was added 1875 g of the precipitated silica filter cake (90 g of silica) and 588 ml of isopropyl alcohol to form a suspension. To this stirred suspension was added a mixture of dimethyldichlorosilane and vinylmethyldichlorosilane in the amounts described in Table 1a. The resulting mixture was heated at 75° C. for 30 minutes. The mixture was cooled to room temperature and 500 ml of toluene were added to the mixture to effect separation of the hydrophobic precipitated silica from the aqueous phase. The aqueous phase was drained from the flask. An additional 500 ml of toluene were added to the flask and the flask content refluxed to remove water by azeotropic distillation. The resulting slurry was poured into pans and the toluene allowed to evaporate overnight. The resulting hydrophobic precipitated silica was further dried for 16 hours at 100° C.

The BET surface area for each hydrophobic precipitated silica was determined by the Brunauer-Emmett-Teller method as described in the *Journal of the American Chemical Society*, Vol. 60, p 309, February 1938. The void volume of each hydrophobic precipitated silica was determined by a densitometer and is expressed as the difference between the reciprocal of the true density and the reciprocal of the bulk density measured under compression as described in Polmanteer et al., Rubber Chem. & Technology, 48:796, 1975. The percent carbon content of the hydrophobic precipitated silica was determined by CHM analysis. The results of these determinations are reported in Table 1a.

The treated precipitated silicas were dispersed into a vinyl functional polydimethylsiloxane gum (0.18 mole % vinyl) at 38 parts per hundred (pph) and the resulting silicone base mixed for 2 hours. To each silicone base was added 0.3 parts per hundred of 2,5-dimethyl-2,5-di(t-butylperoxy)hexane. This catalyzed silicone base was allowed to age for 1 to 3 days. Cured slabs of silicone rubber were prepared by hot pressing samples of the catalyzed silicone base in a mold at 5000 psi for 10 minutes at 177° C.

Mechanical properties of the cured silicone rubber were determined by the following ASTM standard methods: Tensile, ASTM D412-87; Tear Die B, ASTM D624; Percent Elongation (%Elong.), ASTM D412; 100% Modulus (100% Mod.), ASTM D412;. The results of this testing are reported in Table 1b.

TABLE 1a

Properties of Hydrophobic Precipitated Silica Treated With Differing Amounts of dimethyldichlorosilane and Vinylmethyldichlorosilane

| Sample No. | $Me_2SiCl_2$ (g) | $MeViSiCl_2$ (g) | Carbon (Wt. %) | Surface Area ($m^2/g$) | Void Vol. (ml/g) |
|---|---|---|---|---|---|
| 1-1 | 17.7 | 1.2 | 2.8 | 226 | 5.15 |
| 1-2 | 25.2 | 0.0 | 3.8 | 217 | 5.12 |
| 1-3 | 17.7 | 0.0 | 2.9 | 226 | 5.27 |
| 1-4 | 25.2 | 1.8 | 3.6 | 220 | 4.93 |
| 1-5 | 21.3 | 0.8 | 3.3 | 255 | 5.00 |
| 1-6 | 21.3 | 0.8 | 3.2 | 217 | 4.90 |
| 1-7 | 21.3 | 0.0 | 3.3 | 219 | 4.91 |
| 1-8 | 21.3 | 1.8 | 3.3 | 220 | 4.60 |
| 1-9 | 30.0 | 1.1 | 4.5 | 217 | 4.29 |
| 1-10 | 21.3 | 0.8 | 3.7 | 215 | 4.53 |

TABLE 1b

Mechanical Properties of Silicone Rubber Reinforced With Hydrophobic Precipitated Silica

| Sample No. | Tensile (MPa) | Elongation (%) | Modulus (100%) | Tear B (kN/m) |
|---|---|---|---|---|
| 1-1 | 5.79 | 715 | 141 | 22.8 |
| 1-2 | 6.14 | 951 | 80 | 30.5 |
| 1-3 | 5.12 | 850 | 97 | 32.6 |
| 1-4 | 5.69 | 640 | 154 | 27.0 |
| 1-5 | 5.99 | 777 | 126 | 29.4 |
| 1-6 | 5.67 | 554 | 168 | 30.3 |
| 1-7 | 5.14 | 686 | 129 | 27.0 |
| 1-8 | 5.66 | 502 | 190 | 22.4 |
| 1-9 | 5.78 | 461 | 203 | 25.2 |
| 1-10 | 5.99 | 629 | 152 | 30.6 |

EXAMPLE 2

A number of hydrophobic precipitated silicas were prepared demonstrating the effects of the treatment and isolation method on the physical characteristics of the hydrophobic precipitated silica. A precipitated silica was formed by neutralizing a sodium silicate solution and portions of the resulting filter cake were used in each of the methods described below. The BET surface area and Void Volume of the precipitated silicas were determine by the methods described in Example 1. The hydrophobic precipitated silicas prepared in each method were compounded into curable silicone bases and cured into test samples as described in Example 1. The plasticity of each curable silicone base was determined as described in ASTM Standard D926 and the durometer (Shore A) was determined as described in ASTM Standard 2240. The results of this testing are provided in Tables 2a and 2b. Other physical properties testing as reported in Tables 2a and 2b where determined by the test methods described in Example 1. Also included in Tables 2a and 2b for comparison purposes are selected physical characteristics of the untreated precipitated silica after washing with several liters of water, filtering, and drying at room temperature.

Method 1

A 1200 g sample of the precipitated silica (11.6 weight percent (Wt. %)solids) was added to a 5 L flask equipped as described in Example 1. Then, with stirring, 400 ml of isopropyl alcohol and 125 ml of deionized water were added to the flask followed by 29.2 ml of dimethyldichlorosilane. The resulting mixture was heated at 78° C. for 15 minutes.

After cooling to room temperature, the resulting hydrophobic precipitated silica slurry was collected by filtration and dried for 16 hours at ambient temperature. The silica was further dried for 7 hours at 70° C. and 16 hours at 150° C.

Method 2

A 1200 g sample of the precipitated silica (11.6 Wt. % solids) was added to a 5 L flask equipped as described in Example 1. Then, with stirring 400 ml of isopropyl alcohol and 125 ml of deionized water were added followed by 29.2 g of dimethyldichlorosilane. The resulting mixture was heated at 78° C. for 15 minutes. After cooling the mixture to room temperature, 1200 ml of toluene were added to the flask. The aqueous phase was drained from the flask and the toluene phase containing the hydrophobic precipitated silica was washed with 500 ml of deionized water. The toluene phase was placed in shallow pans and the toluene allowed to evaporate overnight at ambient temperature. The resulting dried hydrophobic precipitated silica was further dried at 75° C. for 7 hours and at 150° C. for 16 hours.

Method 3

A 1200 g sample of the precipitated silica (11.6 Wt. % solids) was added to a 5 L flask equipped as described in Example 1. Then, with stirring, 400 ml of isopropyl alcohol and 125 ml of deionized water were added followed by 29.2 g of dimethyldichlorosilane. The resulting mixture was heated at 65° C. for 15 minutes. After cooling to room temperature, the resulting hydrophobic precipitated silica was collected by filtration of the mixture. The hydrophobic precipitated silica was slurried in 1 L of deionized water and filtered with washing until the pH of the filtrate was pH 1.7. The hydrophobic precipitated silica filter cake was transferred to shallow pans and allowed to air dry for 16 hours at ambient temperature. The hydrophobic precipitated silica was further dried for 7 hours at 70° C. and 7 hours at 150° C.

Method 4

A 1200 g sample of the precipitated silica (11.6 Wt. % solids) was added to a 5 L flask equipped as described in Example 1. Then, with stirring, 400 ml of isopropyl alcohol and 125 ml of deionized water were added followed by 29.2 g of dimethyldichlorosilane. The resulting mixture was heated at 78° C. for 15 minutes. After cooling the mixture to room temperature, 1200 ml of toluene were added to the flask. The aqueous phase was drained from the flask and the toluene phase containing the hydrophobic precipitated silica washed with 500 ml of deionized water. The toluene phase was then refluxed to remove residual water by azeotropic distillation. The toluene phase was cooled and transferred to shallow pans and the toluene allowed to evaporate overnight at ambient temperature. The hydrophobic precipitated silica was further dried at 75° C. for 60 hours and at 150° C. for 7 hours.

Method 5

A 1200 g sample of the precipitated silica (11.6 Wt. % solids) was added to a 5 L flask equipped as described in Example 1. Then, with stirring, 400 ml of isopropyl alcohol and 125 ml of deionized water were added followed by 29.2 g of dimethyldichlorosilane. The resulting mixture was heated at 78° C. for 15 minutes. After cooling the mixture to room temperature, 900 ml of toluene were added to the flask causing the hydrophobic precipitated silica to flocculated into large globules. The flocculated hydrophobic precipitated silica was recovered by filtration and the filter cake washed with 1 L of deionized water. The hydrophobic precipitated silica was transferred into a shallow pan and air dried overnight at ambient temperature. The hydrophobic precipitated silica was further dried at 75° C. for 16 hours and at 150° C. for 7 hours.

Method 6

A 1200 g sample of the precipitated silica (11.6 Wt. % solids) was added to a 5 L flask equipped as described in Example 1. Then, with stirring, 400 ml of isopropyl alcohol and 125 ml of deionized water were added followed by the addition of 76.4 g of hexamethyldisiloxane, 200 ml of concentrated HCl, and an additional 74 ml of isopropyl alcohol. The resulting mixture was stirred at room temperature for 3 hours and then 1.5 L of toluene were added with mild stirring. The aqueous phase was drained from the flask and the remaining toluene phase containing the hydrophobic precipitated silica was washed with 500 ml of deionized water. The toluene phase was refluxed to remove residual water by azeotropic distillation. The toluene phase was transferred into shallow pans and the toluene allowed to evaporate overnight at ambient temperature. The hydrophobic precipitated silica was further dried at 75° C. for 16 hours and at 150° C. for 7 hours.

TABLE 2a

Effect of Treatment and Separation Method on Mechanical Properties of Hydrophobic Precipitated Silica

| Method No. | Surface Area (m²/g) | Void Volume (ml/g) | Plasticity (mil) |
|---|---|---|---|
| Comparison | 241 | 2.80 | * |
| 1 | 225 | 6.12 | 89 |
| 2 | 187 | 4.95 | * |
| 3 | 280 | 6.37 | 129 |
| 4 | 195 | 6.80 | 144 |
| 5 | 193 | 5.76 | 144 |
| 6 | 192 | 5.27 | 169 |

* Indicates testing not conducted

TABLE 2b

Effect of Hydrophobic Precipitated Silica on Physical Mechanical of Silicone Rubber

| Method No. | Durometer (Shore A) | Tensile (MPa) | Elongation (%) | Modulus (100%) | Tear B (kN/m) |
|---|---|---|---|---|---|
| Comparison | 62 | 3.47 | 635 | 268 | * |
| 1 | 44 | 6.76 | 675 | 104 | 11.7 |
| 2 | * | * | * | * | * |
| 3 | 50 | 6.53 | 580 | 124 | 20.7 |
| 4 | 46 | 6.13 | 721 | 113 | 32.0 |
| 5 | 47 | 7.72 | 635 | 140 | 24.5 |
| 6 | 56 | 5.31 | 410 | 212 | 15.1 |

* Indicates testing not conducted

EXAMPLE 3

A number of hydrophobic precipitated silicas were prepare by treating precipitated silicas of differing surface areas using a mixture of dimethyldichlorosilane and vinylmethyldichlorosilane as hydrophobing agents. The physical characteristic of the hydrophobic precipitated silicas were determined by the methods described in Examples 1 and 2. A curable silicone base was formed using each of the hydrophobic precipitated silicas by the method described in Example 1. The plasticity of the curable silicone base was determined, the base cured, and physical properties determined by methods described in Examples 1 and 2. In addition the percent compression set (Com. Set) was determined by ASTM Standard D395 at 22 hours. The results of these determinations are described in Tables 3a and 3b.

Sample 3-1

A precipitated silica was formed by neutralizing a sodium silicate solution and then filtering and washing. An aliquot of the precipitated silica was spray dried and the BET surface area of the dried silica determined to be 133 m²/g. About 2000 g of the precipitated silica filter cake (16.5 Wt. % solids) were placed in a 5 L flask equipped as described in Example 1. With stirring, 640 ml of isopropyl alcohol were added to the flask followed by the addition of a mixture consisting of 31.9 g of dimethyldichlorosilane and 1.08 g of vinylmethyldichlorosilane. The resulting mixture was heated at 82° C. for 30 minutes. After cooling the mixture to ambient temperature, 1500 ml of toluene were added to the flask. The aqueous phase was drained from the flask and the toluene phase was washed with 500 ml of deionized water. An additional 500 ml of toluene were added to the flask and the flask contents refluxed to remove water by azeotropic distillation. The resulting slurry was poured into shallow pans and the toluene allowed to evaporate overnight at ambient temperature. The resulting hydrophobic precipitated silica was further dried for 7 hours at 120° C.

Sample 3-2

A precipitated silica was formed by neutralizing a sodium silicate solution and then filtering and washing. An aliquot of the precipitated silica was spray dried and the BET surface area of the dried silica determined to be 294 m²/g. About 2000 g of the precipitated silica filter cake (13 Wt. % solids) were placed in a 5 L flask equipped as described in Example 1. With stirring, 250 ml of deionized water and 663 ml of isopropyl alcohol were added to the flask followed by the addition of a mixture consisting of 91.2 g of dimethyldichlorosilane and 3.13 g of vinylmethyldichlorosilane. The resulting mixture was heated at 65° C. for 15 minutes. After cooling the mixture to ambient temperature, 1500 ml of toluene were added to the flask. The aqueous phase was drained from the flask and the toluene phase washed with 500 ml of deionized water. An additional 500 ml of toluene were added to the flask and the flask content refluxed to remove water by azeotropic distillation. The resulting slurry was poured into shallow pans and the toluene allowed to evaporate overnight at ambient temperature. The resulting hydrophobic precipitated silica was further dried for 7 hours at 80° C.

Sample 3-3

A precipitated silica was formed by neutralizing a sodium silicate solution and then filtering and washing. An aliquot of the precipitated silica was spray dried and the BET surface area of the dried silica determined to be 241 m²/g. About 2000 g of the precipitated silica filter cake (17.1 Wt. % solids) were placed in a 5 L flask equipped as described in Example 1. With stirring, 250 ml of deionized water and 636 ml of isopropyl alcohol were added to the flask followed by the addition of a mixture consisting of 97.5 g of dimethyldichlorosilane and 3.24 g of vinylmethyldichlorosilane. The resulting mixture was heated at 65° C. for 15 minutes. After cooling the mixture to ambient temperature, 1450 ml of toluene were added to the flask. The aqueous phase was drained from the flask and the toluene phase washed with 500 ml of deionized water. An additional 500 ml of toluene were added to the flask and the flask content refluxed to remove water by azeotropic distillation. The resulting slurry was poured into shallow pans and the toluene allowed to evaporate overnight at ambient temperature. The resulting hydrophobic precipitated silica was further dried for 16 hours at 80° C.

Sample 3-4

A precipitated silica was formed by neutralizing a sodium silicate solution and then filtering and washing. An aliquot of the precipitated silica was spray dried and the BET surface area of the dried silica determined to be 401 m²/g. About 2000 g of the precipitated silica filter cake (20.6 Wt. % solids) were placed in a 5 L flask equipped as described in Example 1. With stirring, 250 ml of deionized water and 613 ml of isopropyl alcohol were added to the flask followed by the addition of a mixture consisting of 183.4 g of dimethyldichlorosilane and 6.22 g of vinylmethyldichlorosilane. The resulting mixture was heated at 65° C. for 15 minutes. After cooling the mixture to ambient temperature, 1450 ml of toluene were added to the flask. The aqueous phase was drained from the flask and the toluene phase washed with 500 ml of deionized water. An additional 500 ml of toluene were added to the flask and the flask content refluxed to remove water by azeotropic distillation. The resulting slurry was poured into shallow pans and the toluene allowed to evaporate overnight at ambient temperature. The resulting hydrophobic precipitated silica was further dried for 16 hours at 80° C.

Sample 3-5

A precipitated silica was formed by neutralizing a sodium silicate solution and then filtering and washing. An aliquot of the precipitated silica was spray dried and the BET surface area of the dried silica determined to be 290 m²/g. About 2000 g of the precipitated silica filter cake (14.4 Wt. % solids) were placed in a 5 L flask equipped as described in Example 1. With stirring, 250 ml of deionized water and 654 ml of isopropyl alcohol were added to the flask followed by the addition of a mixture consisting of 91.7 g of dimethyldichlorosilane and 3.13 g of vinylmethyldichlorosilane. The resulting mixture was heated at 65° C. for 15 minutes. After cooling the mixture to ambient temperature, 1450 ml of toluene were added to the flask. The aqueous phase was drained from the flask and the toluene phase washed with 500 ml of deionized water. An additional 500 ml of toluene were added to the flask and the flask content refluxed to remove water by azeotropic distillation. The resulting slurry was poured into shallow pans and the toluene allowed to evaporate overnight at ambient temperature. The resulting hydrophobic precipitated silica was further dried for 16 hours at 80° C.

TABLE 3a

Physical Properties of Hydrophobic Precipitated Silica and Silicone Base Formed Therewith

| Sample No. | Untreated Surface Area (m²/g) | Treated Surface Area (m²/g) | Void Volume (ml/g) | Carbon (Wt. %) | Plasticity (mil) |
|---|---|---|---|---|---|
| 3-1 | 133 | 90 | 4.8 | 1.6 | 93 |
| 3-2 | 241 | 144 | 4.3 | 3.9 | 89 |
| 3-3 | 290 | 198 | 4.6 | * | 108 |
| 3-4 | 294 | 213 | 4.2 | 4.4 | 116 |
| 3-5 | 401 | 202 | 2.8 | 6.9 | 81 |

* Indicates test not conducted

TABLE 3b

Effect of Hydrophobic Precipitated Silica on Physical Properties of Silicone Rubber

| Sample No. | Durometer (Shore A) | Tensile (MPa) | Elongation (%) | Modulus (100%) | Tear B (kN/m) | Comp. Set (%) |
|---|---|---|---|---|---|---|
| 3-1 | 43 | 7.07 | 561 | 125 | 9.3 | 59 |
| 3-2 | 46 | 5.96 | 527 | 131 | 14.0 | 54 |

TABLE 3b-continued

Effect of Hydrophobic Precipitated Silica on
Physical Properties of Silicone Rubber

| Sample No. | Durometer (Shore A) | Tensile (MPa) | Elongation (%) | Modulus (100%) | Tear B (kN/m) | Comp. Set (%) |
|---|---|---|---|---|---|---|
| 3-3 | 48 | 5.41 | 650 | 112 | 26.1 | 88 |
| 3-4 | 48 | 6.85 | 740 | 145 | 30.5 | 93 |
| 3-5 | 43 | 3.74 | 374 | 114 | 5.8 | 27 |

EXAMPLE 4

A precipitated silica was treated with dimethyldichlorosilane and hexamethyldisiloxane to form a hydrophobic precipitated silica. A precipitated silica was formed by neutralizing a sodium silicate solution and then filtering and washing. An aliquot of the precipitated silica was spray dried and the BET surface area of the dried silica determined to be 337 m²/g. About 763 g of the precipitated silica filter cake (11.8 Wt. % solids) were placed in a 5 L flask equipped as described in Example 1. With stirring, 1.1 L of deionized water and 595 ml of isopropyl alcohol were added to the flask followed by the addition of 15.9 g of dimethyldichlorosilane. The resulting mixture was heated at 65° C. for 20 minutes. After cooling the mixture to ambient temperature, 300 ml of concentrated HCl, 100 ml of isopropyl alcohol, and 11.5 g of hexamethyldisiloxane were added. Stirring of the mixture was continued for 30 minutes at ambient temperature and then 250 ml of toluene were added to the flask. The aqueous phase was drain from the flask and 250 ml of deionized water and an additional 250 ml of toluene were added to the flask. The aqueous phase was again drained from the flask, another 250 ml of toluene were added to the flask, and the flask content refluxed to remove water by azeotropic distillation. The resulting slurry was poured into shallow pans and the toluene allowed to evaporate overnight at ambient temperature. The resulting hydrophobic precipitated silica was further dried for 5 hours at 120° C. Yield of the hydrophobic precipitated silica was 97.5 g. The dried hydrophobic precipitated silica had a BET surface are of 243 m²/g and a void volume of 4.19 cm³/g.

EXAMPLE 5

A precipitated silica was treated with 3,3,3-trifluoropropyldimethylchlorosilane to form a hydrophobic precipitated silica. A precipitated silica was formed by neutralizing a sodium silicate solution and then filtering and washing. An aliquot of the precipitated silica was spray dried and the BET surface area of the dried silica determined to be 337 m²/g. About 1700 g of the precipitated silica filter cake (11.8 Wt. % solids) was placed in a 5 L flask equipped as described in Example 1. With stirring, 220 ml of deionized water and 580 ml of isopropyl alcohol were added to the flask followed by the addition of a mixture consisting of 89.7 g of 3,3,3-trifluoropropyldimethylchlorosilane and 3.78 g of vinyldimethylchlorosilane. The resulting mixture was heated at 73° C. for 20 minutes. After cooling the mixture to ambient temperature, 800 ml of methylisobutylketone (MIBK) was added to the flask. The aqueous phase was drained from the flask and 250 ml of deionized water and 200 ml of MIBK were added. The aqueous phase was drained from the flask, an additional 1 L of MIBK added, and the flask content refluxed to remove water by azeotropic distillation. The resulting slurry was poured into shallow pans and the MIBK allowed to evaporate overnight at ambient temperature. The resulting hydrophobic precipitated silica was further dried for 6 hours at 120° C. and 48 hours at 80° C. The yield of hydrophobic precipitated silica was 266.3 g.

We claim:

1. A method for the preparation of hydrophobic precipitated silica comprising contacting an aqueous suspension of a hydrophilic precipitated silica with (1) a catalytic amount of an acid and (2) an organosilicon compound selected from the group consisting of organosilanes described by formula $$R^1_a H_b SiX_{4-a-b},$$

organosiloxanes described by formula $$R^2_n SiO_{(4-n)/2},$$

and organodisilazanes described by formula $$(R^3_3 Si)_2 NH,$$

in the presence of (3) a water-miscible organic solvent in an amount sufficient to facilitate reaction of the hydrophilic precipitated silica with the organosilicon compound to form a hydrophobic precipitated silica; where each $R^1$ is an independently selected hydrocarbon radical comprising 1 to about 12 carbon atoms, each $R^2$ is independently selected from the group consisting of hydrogen, chlorine, hydroxy, and hydrocarbon radicals comprising 1 to about 12 carbon atoms with the proviso that at least 50 mole percent of the $R^2$ substituents are hydrocarbon radicals, each $R^3$ is an independently selected hydrocarbon radical comprising 1 to about 12 carbon atoms, each X is an independently selected hydrolyzable group bonded to silicon, a=1, 2, or 3; b=0 or 1; a+b=1, 2, or 3 with the proviso that when b=1 then a+b=2 or 3; and n is an integer from 2 to 3 inclusive.

2. A method according to claim 1, where the hydrophilic precipitated silica has a BET surface area within a range of about 50 m²/g to 1000 m²/g.

3. A method according to claim 1, where the hydrophilic precipitated silica has a BET surface area within a range of about 100 m²/g to 500 m²/g.

4. A method according to claim 1, where the aqueous suspension comprises about 4 to 50 weight percent of the hydrophilic precipitated silica.

5. A method according to claim 1, where the aqueous suspension comprises about 4 to 20 weight percent of the hydrophilic precipitated silica.

6. A method according to claim 1, where the organosilicon compound comprises chlorine substituted on silicon and the catalytic amount of an acid is generated in situ by hydrolysis of the chlorine or reaction of the organosilicon compound with hydroxyl substituents of the hydrophilic precipitated silica.

7. A method according to claiml, where each X is independently selected from the group consisting of halogen, alkoxy radicals comprising 1 to about 12 carbon atoms, acyloxy radicals comprising 1 to about 12 carbon atoms, and oximo radicals.

8. A method according to claim 1, where the acid is added in an amount sufficient to provide a pH in the aqueous suspension less than about pH 3.

9. A method according to claim 1, where the contacting is conducted at a temperature within a range of about 15° C. to 250° C.

10. A method according to claim 1, where the contacting is conducted at a temperature within a range of about 20° C. to 150° C.

11. A method according to claim 1, where the water-miscible organic solvent comprises at least 5 weight percent of the aqueous suspension.

12. A method according to claim 1, where the water-miscible organic solvent comprises about 15 to 50 weight percent of the aqueous suspension.

13. A method according to claim 1, where the water-miscible organic solvent comprises about 15 to 50 weight percent of the aqueous suspension.

14. A method according to claim 1, where the water-miscible organic solvent is an alcohol.

15. A method according to claim 1, where the water-miscible organic solvent is isopropanol.

16. A method according to claim 1, further comprising adding a water-immiscible organic solvent to the aqueous suspension after formation of the hydrophobic precipitated silica at a solvent to silica weight ratio within a range of about 1:1 to 5:1 to facilitate separation of the hydrophobic precipitated silica from the aqueous suspension.

17. A method according to claim 1, where the organosilicon compound is an organosilane.

18. A method according to claim 1, where the organosilicon compound is an organosiloxane.

\* \* \* \* \*